(12) United States Patent
West et al.

(10) Patent No.: US 12,244,263 B2
(45) Date of Patent: Mar. 4, 2025

(54) FRAMELESS AND SHARED FRAME PV MODULES AND TORQUE TUBE MOUNTING SYSTEMS FOR SAME

(71) Applicant: Ojjo, Inc., San Rafael, CA (US)

(72) Inventors: Jack West, San Rafael, CA (US); Greg McPheeters, Santa Cruz, CA (US); Charles Almy, Berkeley, CA (US)

(73) Assignee: Ojjo, Inc., San Rafael, CA (US)

( * ) Notice: Subject to any disclaimer, the term of this patent is extended or adjusted under 35 U.S.C. 154(b) by 491 days.

(21) Appl. No.: 17/017,645

(22) Filed: Sep. 10, 2020

(65) Prior Publication Data

US 2021/0075366 A1    Mar. 11, 2021

Related U.S. Application Data

(60) Provisional application No. 62/898,429, filed on Sep. 10, 2019.

(51) Int. Cl.
    *H02S 30/10*    (2014.01)
    *F16M 13/02*    (2006.01)
    *H02S 40/36*    (2014.01)

(52) U.S. Cl.
    CPC .............. *H02S 30/10* (2014.12); *F16M 13/02* (2013.01); *H02S 40/36* (2014.12)

(58) Field of Classification Search
    CPC .......... H02S 20/00; H02S 20/30; H02S 20/32; H02S 30/10
    See application file for complete search history.

(56) References Cited

U.S. PATENT DOCUMENTS

| | | | |
|---|---|---|---|
| 2009/0211625 A1* | 8/2009 | Schwarze | H02S 20/22 156/92 |
| 2010/0139743 A1* | 6/2010 | Hadar | H02J 3/381 136/251 |
| 2011/0303262 A1* | 12/2011 | Wolter | F24S 25/11 136/251 |
| 2012/0298817 A1 | 11/2012 | West et al. | |
| 2014/0007926 A1* | 1/2014 | Korman | H02S 40/32 136/251 |
| 2015/0207452 A1 | 7/2015 | Werner et al. | |

(Continued)

FOREIGN PATENT DOCUMENTS

EP    1860705 A1 * 11/2007    ........... H01L 31/048
KR    1020080108640    12/2008

OTHER PUBLICATIONS

International Search Report for PCT/US2020/050246 issued Dec. 22, 2020.

*Primary Examiner* — Christina Chern
(74) *Attorney, Agent, or Firm* — Phillip D. Mancini

(57) ABSTRACT

A shared frame photovoltaic module and related mounting system for single-axis trackers. Each module has no frame, or a partial frame on two of four sides. A shared frame rail captures adjacent modules edges, providing frame support and attaching them to the tracker torque tube eliminating structural redundancy in conventional module frames. In some embodiments, each module is unframed with mounting pucks attached to the underside of the photovoltaic laminate. Torque tube mounting brackets have connecting portions for attaching respective pairs of mounting pucks on opposing sides of the torque tube.

12 Claims, 8 Drawing Sheets

(56) References Cited

U.S. PATENT DOCUMENTS

| | | | |
|---|---|---|---|
| 2015/0326176 A1* | 11/2015 | Austin .................... H02S 40/34 | |
| | | | 136/246 |
| 2016/0365827 A1 | 12/2016 | Au | |
| 2017/0093329 A1 | 3/2017 | Jensen | |
| 2018/0076763 A1* | 3/2018 | Cruz ....................... H02S 30/10 | |
| 2021/0131099 A1* | 5/2021 | Kossman .................. E04C 3/11 | |

* cited by examiner

FRAMELESS AND SHARED FRAME PV MODULES AND TORQUE TUBE MOUNTING SYSTEMS FOR SAME

CROSS-REFERENCE TO RELATED APPLICATIONS

This claims priority to U.S. provisional patent application No. 62/898,429 filed Sep. 10, 2019, titled "MOUNTING SYSTEMS FOR REDUCED FRAME PHOTOVOLTAIC MODULES WITH SHARE FRAME BARS", the disclosure of which is hereby incorporated by reference in its entirety.

BACKGROUND

In the twenty-first century, solar has become one of the cheapest sources of electrical energy. Solar energy refers to interconnected arrays of photovoltaic modules or solar panels that convert incident light into electrical energy via the photovoltaic effect. Solar arrays may be supported on residential or commercial roof tops, by ground-mounted fixed tilt arrays, on single-axis trackers and even on dual-axis trackers. Unlike rooftop and fixed tilt arrays, trackers change the orientation of the modules throughout each day to follow the sun's position through the sky, keeping the surface of the panels pointed towards the sun. The focus of this disclosure is on systems for use with utility-scale single-axis trackers, however, the various embodiments disclosed herein may also be relevant to dual-axis trackers, ground-mounted arrays and commercial and residential roof-top solar.

In a utility-scale sized tracker arrays, solar panels are attached to long tubes known as torque tubes or to hinged purlins or other rotating structures along several North-South rows and rotational torque is applied to the entire assembly so that all the attached panels move as one. In this way, a single motor or drive mechanism can move many panels at once. Solar panels may be arranged along the row as single modules in portrait orientation (long frame sections transverse to the torque tube), single modules in landscape (short frame sections transverse to the torque tube), or two or more modules together in portrait or landscape.

In order to maximize solar energy's competitiveness relative to traditional fossil fuel-based energy sources and to attract more investment dollars, it is important to continue to improve and optimize solar energy systems, such as by reducing and ideally eliminating physical and mechanical redundancy. Because solar panels are used in a variety of different applications, and for ease of manufacturing and interchangeability, their structure, dimensions, and operating points have become standardized across manufacturers. Residential modules are typically 60-cell whereas commercial or utility-scale modules are typically 72-cell. This enables developers and installers to buy photovoltaic modules on the spot market from different suppliers without needing to be concerned about interoperability with third-party solar racking systems (e.g., the hardware used to attach panels to their support structure). However, the downside of this standardization is that modules are not optimized from a cost or material usage perspective for the particular application they will be used in (e.g., rooftop, single-axis tracker, fixed-tilt array, etc.). Various embodiments of this disclosure seek to provide photovoltaic modules and racking hardware for such modules that is optimized, in particular, for single-axis solar trackers.

In recognition of this problem, it is an object of various embodiments of this disclosure to provide reduced and/or shared frame photovoltaic modules particularly optimized for use with single-axis trackers, and to provide torque tube mounting rails for such modules.

DETAILED DESCRIPTION

The following description is intended to convey a thorough understanding of the embodiments described by providing a number of specific embodiments and details involving A-frame foundations used to support single-axis solar trackers. It should be appreciated, however, that the present invention is not limited to these specific embodiments and details, which are exemplary only. It is further understood that one possessing ordinary skill in the art in light of known systems and methods, would appreciate the use of the invention for its intended purpose.

Figure 1A:
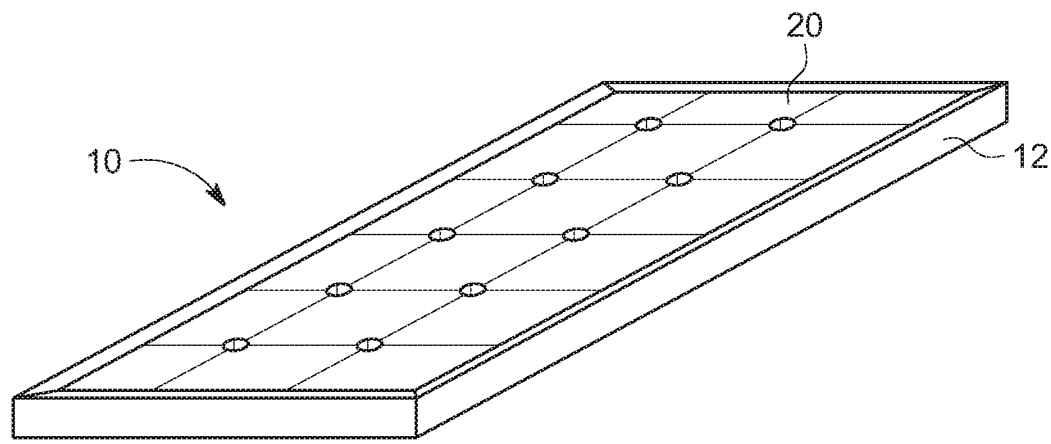
FIG. 1A shows a conventional photovoltaic module.
Figure 1B:
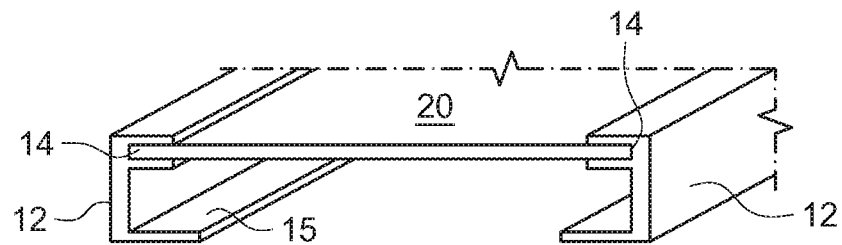
FIG. 1B is a section view of the conventional photovoltaic module of FIG. 1A.
Figure 1C:
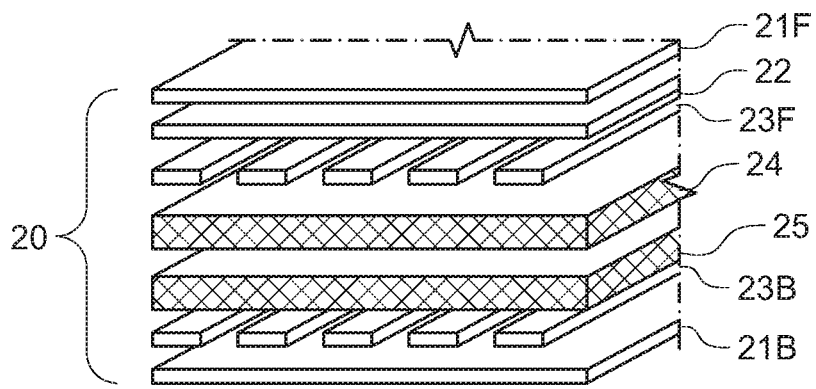
FIG. 1C is a partial exploded view of the layers making up the laminate stack of a conventional photovoltaic module.

Turning to the figures, FIGS. 1A-C show different views of conventional (e.g., prior art) photovoltaic (PV) module 10. Module 10 consists of laminate stack 20 surrounded by protective frame 12. As shown, module frame 12 consists of four pieces of extruded aluminum that wrap all the way around the edge of laminate stack 20. The ledge of laminate stack 20 is received in recess 14 of frame 12 to provide protection against bending as well as during installation and transport. Frame 12 includes flange 15 at the bottom of the extrusion that provides a surface for mounting hardware and other accessories to attach to.

As shown in 1C, in a standard PV module, laminate stack 20 typically consists of a layer of top glass 21F, anti-reflective coating layer 22, top contact layer 23F, N-type silicon layer 24, P-type silicone layer 25, back contact layer 23B, and bottom glass 21B. Top and bottom contact layers 23F/23B consist of a grid of electrical contacts made from silver or other stable, conductive metal that allow electrons to flow from across the gap between positive and negatively doped layers 25, 24 respectively and out of the modules via positive and negative wire leads external to the module. The junction between negative and positively doped layers 24, 25 creates an electric field. As photons strike the PV module, current flows from front contact layer 24 through a load to back contact layer 25 as photons dislodge electrons from the negatively charged layer with electrical bias from the positively charged layer. Back sheet 21B seals the components and provides an aesthetic affect visible from the top. In the case of bi-facial modules, a third negative layer may be inserted on the bottom of the positively charged layer with a layer of clear bottom glass to harvest energy reflected from below to create a second energy generating layer for photons entering from the bottom side of the module.

Laminate stack 20 is received on all sides in groove or channel 14 formed in adjoining frame members 12. Frame members 12 protect the laminate during shipping and handling and provide a surface that can be clamped, drilled, or otherwise altered to allow the module to be attached to racking hardware without damaging the active energy producing layers. Though not shown in the figure, a junction box is usually located on the back side of the module with a pair of electrical lead wires (V+ and V−) and terminal connectors extending from it. As discussed in the background, a module with this basic configuration may be used in retro-fit rooftop solar, ground mounted fixed-tilt arrays, or in multi-acre utility-scale solar tracker arrays.

In a standardized module configured as module 10 shown in FIG. 1A, the aluminum extrusion making up frame 12 extends nearly eighteen feet in length. For a 300-watt module, assuming a dollar per foot for the extrusion, that amounts to 6-cents per watt—a significant cost in a multi hundred-megawatt array. Due to a variety of reasons, including investments in manufacturing capacity and economies of scale, the price of solar panels has dropped significantly over the past decade from nearly three dollars per watt to below 50-cents per watt. Most of the cost reduction is reflective of a reduction in the cost of manufacturing the laminate stack. By contrast, the price of frames has come down slightly, but extrusion price reductions are limited by an increasing price of the base raw material, aluminum. Therefore, the eighteen feet of extruded aluminum making up the frame of a conventional module contributes to between ten (10) and twenty (20) percent of the per watt cost. Therefore, the cost of solar panels, and by extension, utility-scale solar, will is dependent on the price of extruded aluminum.

Figure 2A:
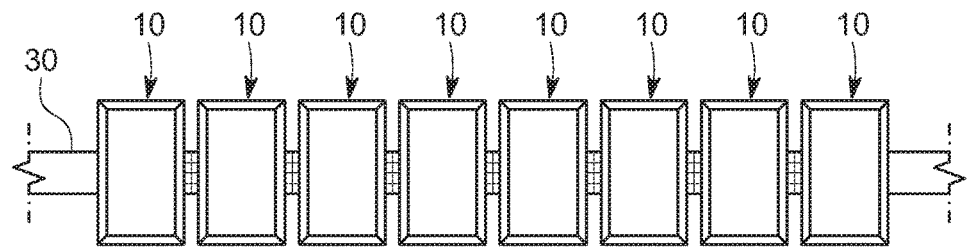
FIG. 2A shows a portion of a conventional single-axis tracker.
Figure 2B:
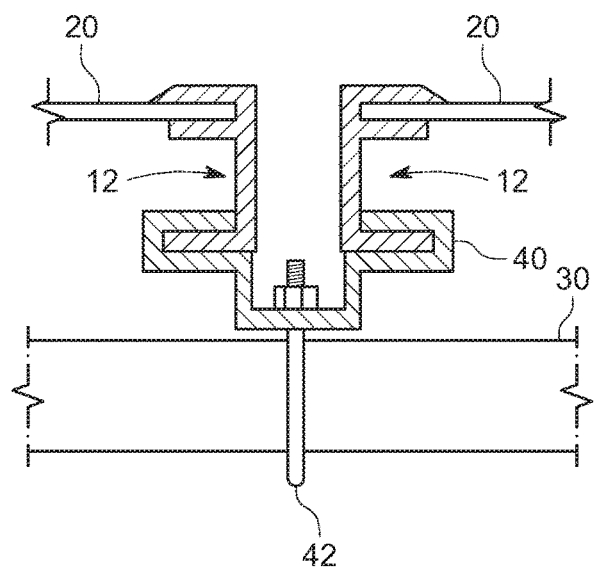
FIGS. 2B and 2C show end and perspective views respectively of a torque tube mounting bracket for photovoltaic modules usable with the conventional single-axis tracker of FIG. 2A.
Figure 2C:
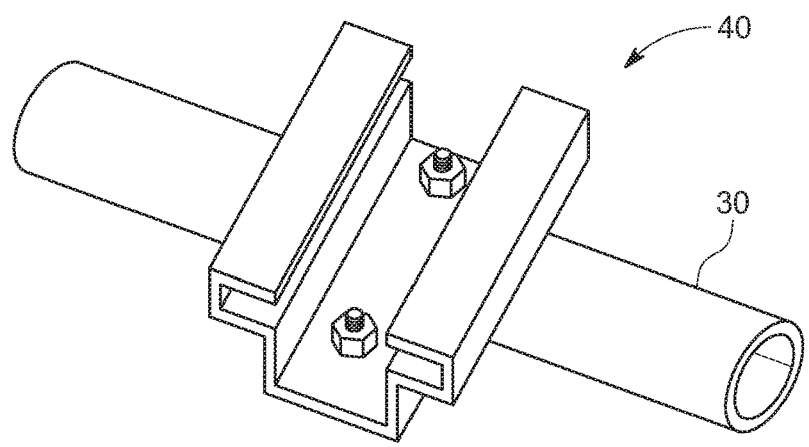

Turning to FIGS. 2A-C, these figures show different views of portions of a single-axis solar tracker and components of such a tracker. In FIG. 2A, a series of PV modules or solar panels 10 are arranged along torque tube 30 so that when the torque tube rotates, the modules remain orthogonal to the sun. FIGS. 2B and C show exemplary torque tube mounting bracket 40 for attaching frames 12 of two adjacent PV modules 10 to the torque tube. In some cases, bracket 40 clamps onto flange 15 of frames 12. Alternatively, bracket 40 may clamp down on the entire thickness of frames 12 to hold two adjacent PV modules in place. Bracket 40 is usually attached to torque tube 30 from below with one or more U-bolts 42 or similar fastening mechanism. It should be appreciated, however, that not all tracker systems use torque tubes. Some instead attach a hinged arm at the top of each foundation and then attach purlins transverse to the opposing ends of the arm. The panels are then attached to the purlins. The drive mechanism in such a tracker applies force to one more of the hinged arms to effect rotation.

FIG. 2B is a section view that shows the fitment between laminate stack 20 and frame members 12 as well as between frame members 12 of adjacent modules 10 and torque tube module bracket 40 in a conventional single-axis tracker. U-bolt 42 passes through bracket 40 on either side of torque tube 30 securing the bracket, and by extension the modules, to the torque tube. Once one bracket is installed, the flange of the first module can be slid into one of the channels on the installed bracket. A second bracket may then be loosely attached to the torque tube under the first module and pulled away from the module along the tube until the opposing flange is seated in the channel of the second bracket. Then the nuts on the U-bolt or U-bracket are tightened to hold the assembly in place and the process is repeated as additional modules are installed along the tube, requiring only a hand-held rotary driver to tighten the pair of nuts securing the U-bolt.

With the conventional configuration shown in FIGS. 2A-C, although the aluminum frame completely circumscribes each module, the only portion that is used to construct the assembly shown in 2A, is along each long side of the rectangular frame, where the module bracket engages the frame flange. Therefore, in a multi-acre utility-scale array, tons of aluminum are consumed just to make up the frames, much of which serves little function in securing the PV module to the torque tube or in the operation of the tracker system generally.

Figure 3A:
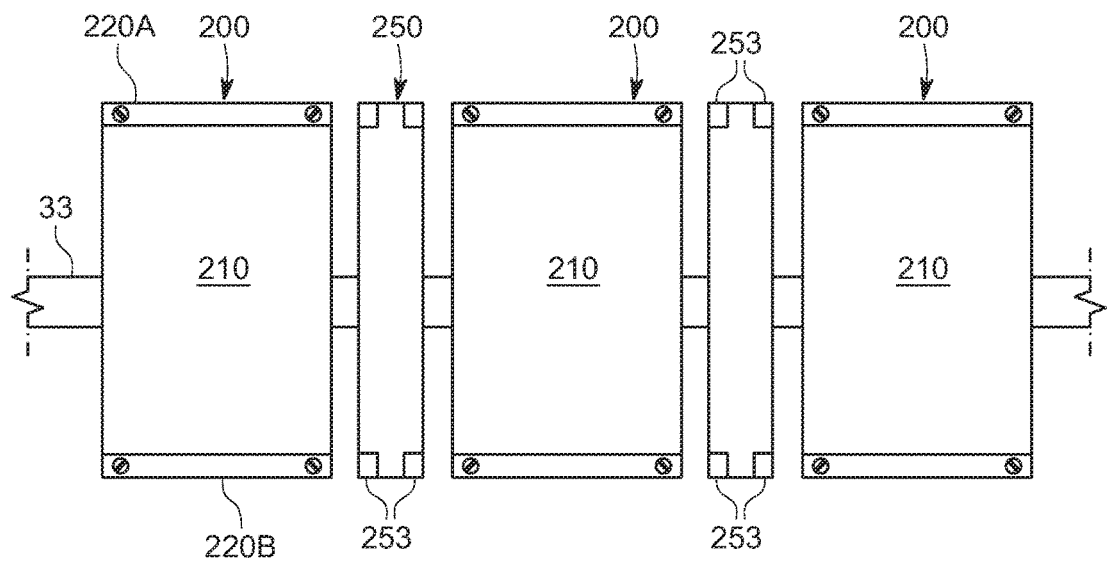
FIGS. 3A-C show different views of shared frame photovoltaic modules and a torque tube mounting rail for shared frame photovoltaic modules according to various embodiments of the invention.
Figure 3B:
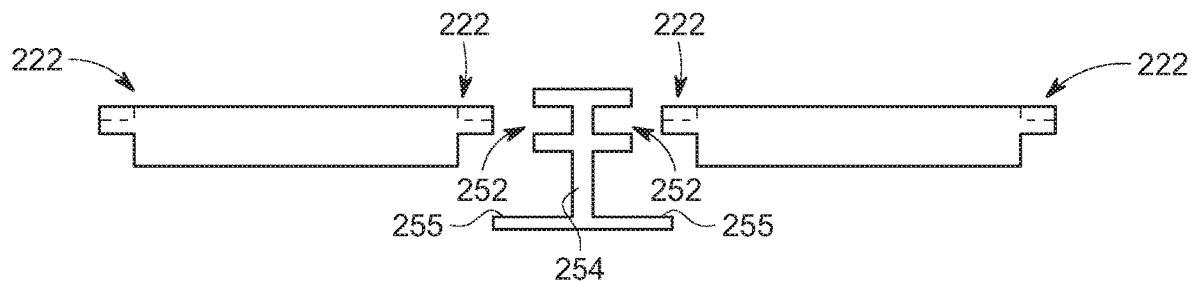
Figure 3C:
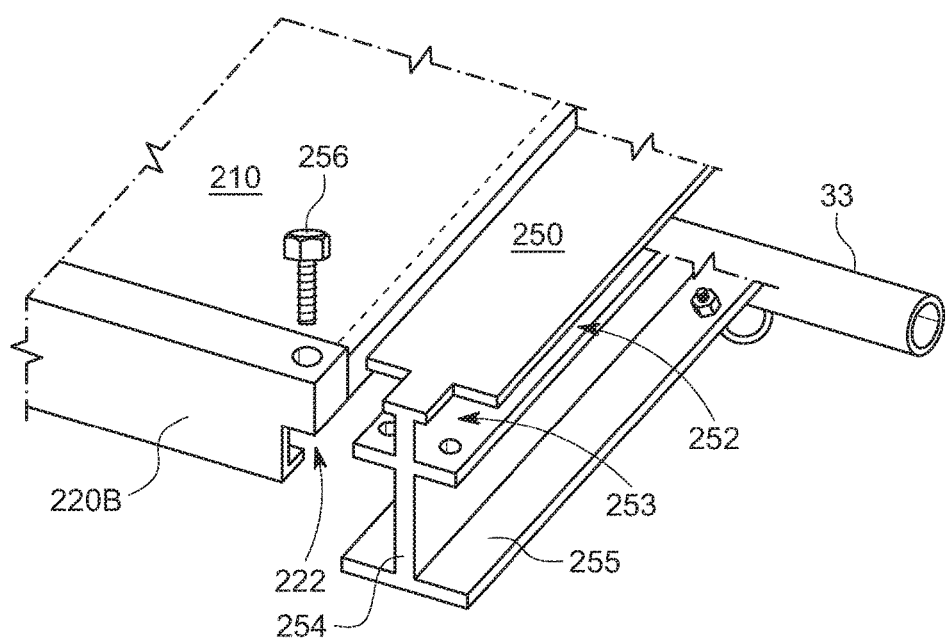

Turning now to FIGS. 3A-C, these figures show different views of shared frame photovoltaic modules 200 and torque tube mounting rail 250 for securing shared frame photovoltaic modules according to various embodiments of the invention. Each shared frame PV module 200 shown in the figures has partial frames members 220A/220B on the short sides only, that is, the sides that are parallel to the torque tube. In various embodiments and as shown in the figures, each partial frame 220A/220B may have a notched thinner portion at each end that fits into a corresponding notch 253 in recess 252 in opposing ends of the shared frame rail 250 as the unframed edge of modules 200 are inserted into frame rail 250. Once inserted into recess 252, frame rail 250 functions just like the module frame 12 in modules 10, protecting the edge of each module, providing rigidity to the panel, and providing a structure for attaching or racking the module to the torque tube. In various embodiments, the long edges of each module 200 may be completely unframed. In other embodiments, they may have a layer of tape, sealant, film, or another suitable protective layer over them. In still further embodiments, they may be protected with a very thin layer of non-structural plastic, aluminum or even metal foil attached with encapsulant or other suitable material to keep dirt and moisture out of the laminate stack.

In various embodiments, once a first module 200 has been attached on one long edge to first shared frame rail 250, a second module is slide into the opposing opening 252 until it buts against spine 254 or notch 253. Then, the next piece of shared frame rail 250 is attached loosely to torque tube 33 and pushed against that module's unframed edge until the unframed edge is seated in recess 252 facing the module. The notched ends 253 in the top of the shared frame rail 250 may provide a visual indicator to the installer that module 200 is fully seated within recess 252 when notched portion 222 at the end of each frame section 220A/220B is seated within notches 253. Then, a screw, bolt or other fastener may be passed through the thin portion of the end frame into a threaded opening below, in the shared frame bar, to secure the module to the frame bar. Alternatively, friction and attachment to the torque tube preventing lateral movement of frame rail 250 along the tube may hold modules 200 within recess 252 without the need for additional fasteners. The fitment of frame members 220A, 220B within notches 253 formed in frame rail 250 will prevent transverse movement of the module, that is, movement perpendicular to the torque tube.

Once shared frame rail 250 is secured to both long ends of module 200 and to torque tube 33, the effect is the same as if a fully framed module was used but with a reduction in the amount of aluminum required to make the assembly since two modules may share one long edge. In various embodiments, and as shown, shared frame rail 250 may extend down from the frame portion via spine 254 to a pair of opposing flanges 255 that provide the standard connection interface that solar racking and tracker manufacturers expect, as seen, for example, in FIG. 4. One or more U-bolts 42 are shown in the exemplary system of these figures to attach shared frame rail 250 to torque tube 33, however, it should be appreciated that various other flange clamping brackets may be used to secure shared frame rail 250 to torque tube 33. Also, flanges 255 may have pre-drilled holes and/or other features to mechanically interface with a damper assembly, thereby eliminating the need for a separate damper bracket to retard unintended rotation of the array.

Figure 4:
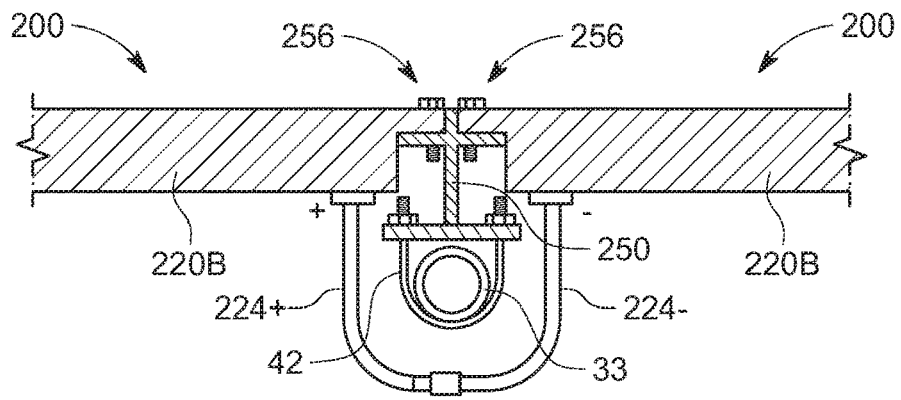
FIG. 4 is an end view of shared frame photovoltaic modules and a torque tube mounting system for shared frame photovoltaic modules shown in FIGS. 3A-C.

Continuing with reference to FIG. 4, this Figure shows the shared frame rail 250 of FIGS. 3A-C after a pair of adjacent partially framed PV modules 200 have been attached. In this example, each module's junction box has been separated into a pair of opposing corner junction boxes (V+ and V−) rather than in the middle so that panel-to-panel connections can be made more easily. Because in single-axis trackers modules are installed in long, unbroken rows, the V+ and V− leads coming from the junction box do not need to be as long as they are with residential roof-top arrays where the array is often be broken up into different shapes and/or on different mounting planes to accommodate the features of the roof. This should reduce the length of wire required to interconnect modules, providing additional material savings on a per module basis. Alternatively, though not shown in the figures, a conductive bridge connector may be used at the point where the partial module frames are connected to the shared frame bar to provide electrical continuity from the V+ output of one module to the V− input of the next without needing to use wires at all. In still further alternatives, the shared frame bar may have one or more embedded insulated conductive channels, for example, at one end, that contact specific conductive pads in the edge of each adjacent PV module to effect electrical interconnection connection between the two at thin ends 220 and corresponding notches 253 of frame rail 250.

It should be appreciated that in various embodiments, the top portion of shared frame rail 250 may be a separate piece that get attached to rest of the frame with screws or other fasteners to clamp down on the unframed module edges. In such embodiments, after the main body of rail 250 is attached to the torque tube and adjacent modules are placed so that their long edges sit in recess 252, the top portion may then be bolted, screwed or otherwise fastened by driving from above with bolts or screws extending from below. In some such embodiments, the fasteners may pass through the end frame sections of the adjacent PV modules. In other embodiments, the fasteners will simply pass through spine 254 between recess 252. The top piece may have projections or other features that penetrate each module at the end frame to lock the module to the shared frame bar and/or to effect ground bonding.

Figure 5A:
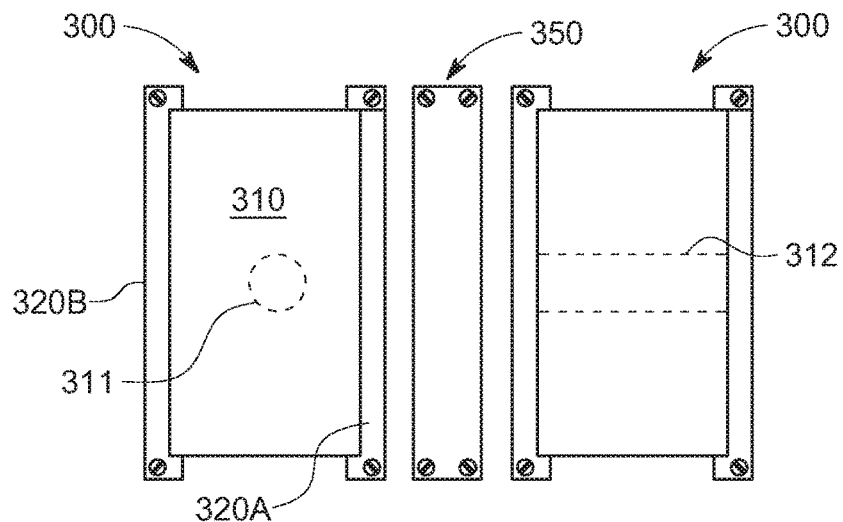
FIGS. 5A and B are top and end views respectively of a shared frame photovoltaic modules and a torque tube mounting system for shared frame photovoltaic modules according to various other embodiments of the invention.
Figure 5B:
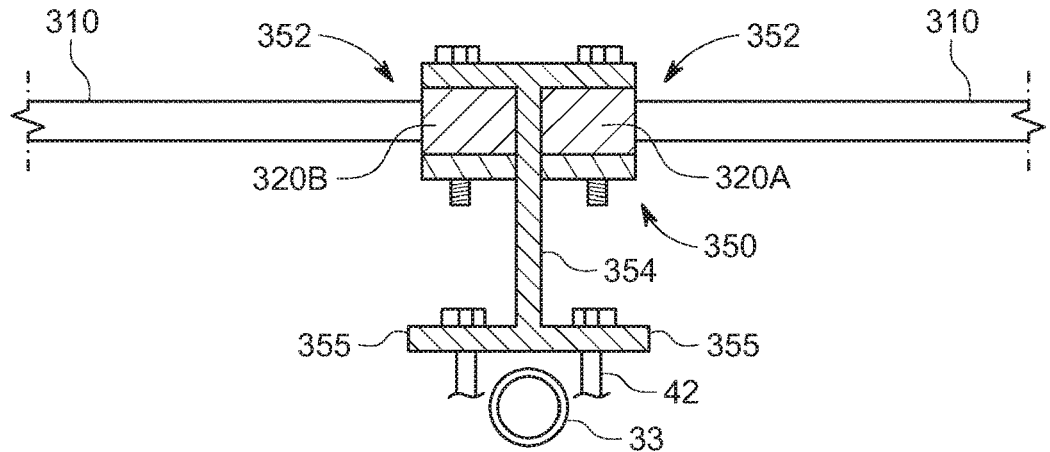

Turning now to FIGS. 5A/B, these figures are top and end views respectively of shared frame photovoltaic modules 300 and torque tube mounting rail 350 for shared frame photovoltaic modules according to various other embodiments of the invention. PV modules 300 according to these embodiments are partially framed with a pair of opposing frame members 320A, 320B on the long edges only, eliminating the need for aluminum frame members on the short edges. The short edges may be sealed with encapsulant, tape, plastic, metal foil, or other non-structural protective material as discussed above to protect them from the environment. In various embodiments, frame members 320A, 320B will extend past the end of each laminate 310 to provide protection of the fragile edge during transport and construction. In a typical single-axis tracker with only a single row of modules in portrait orientation, the short edges of the module frame may not be connected to the tracker system at all. Instead, they only provide resistance to sagging. Here the long edge frame members 320A/320B are inserted into recesses 352 formed in shared frame rail 350 and then bolted, screwed, or otherwise held in place, as seen, for example, in FIG. 5B. Then, shared frame rail 350 may be attached to torque tube 33 as discussed herein. Module-to-module electrical connections may be done in the same manner as discussed above in the context of FIGS. 3A-C and FIG. 4, or done using conventional means (e.g., junction boxes and wires with connectors). Also, as discussed above, the top portion of shared frame rail 350 may be detachable so that it clamps down on frame sections 320A/320B of two adjacent modules, locking them into recesses 352. It should be appreciated that a puck, spacer, or other suitable rest 311 may be attached to the back side of each module 300 to allow the torque tube to help laminate 310 resist sagging in the absence of a full frame. Alternatively, a single-frame bar, such as bar 312 shown in 5A may extend across the backside at the middle of each laminate to increase rigidity and prevent sagging.

Figure 6A:
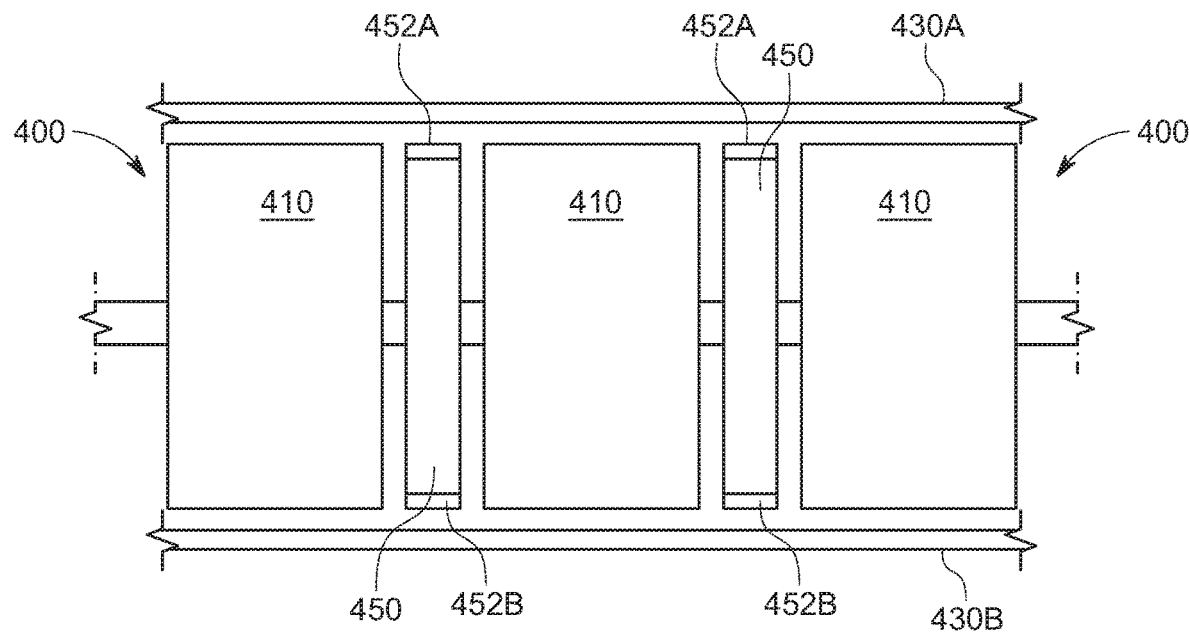
FIGS. 6A-C show different views of shared frame photovoltaic modules and a torque tube mounting system for shared frame photovoltaic modules according to further embodiments of the invention.
Figure 6B:
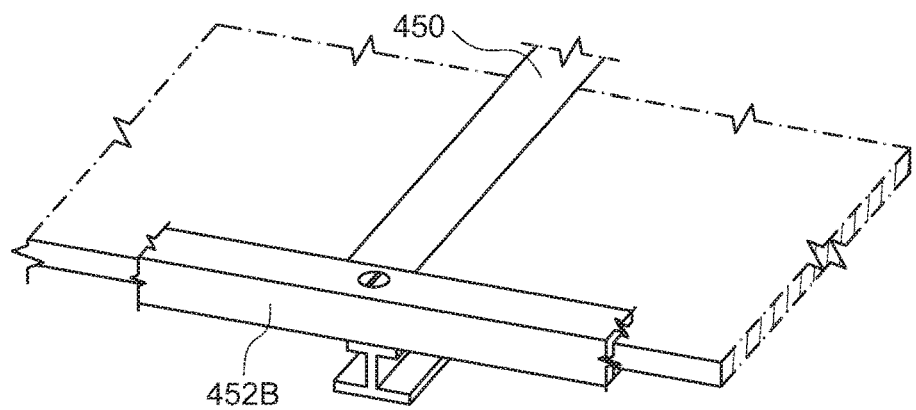
Figure 6C:
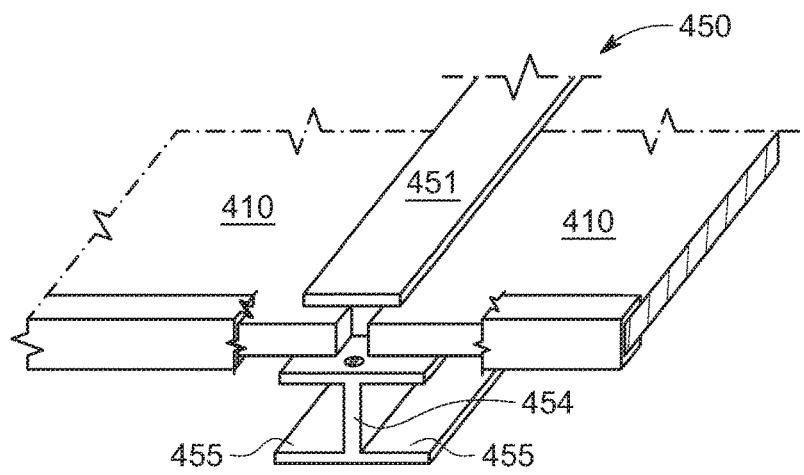

Turning now to FIGS. 6A-C, these figures show different views of shared frame photovoltaic modules 410 and shared torque tube mounting rail 450 for shared frame photovoltaic modules according to further embodiments of the invention. Modules 400 shown here are substantially frameless, that is devoid of a rigid aluminum frame circumscribing laminate 410. Frameless modules, and in particular, frameless glass-on-glass modules have been used in the prior art, however, they are more expensive than standard modules, require thicker, heavier and more expensive glass, and a larger border of non-active material around the active (i.e., energy-generating) portion. Typically, they are attached with a clamp or other device that pinches the edge of the module at the non-active material border so that it can be attached to racking hardware. Due to their increased cost, they are rarely if ever used in utility-scale solar trackers where little if any value is given to aesthetics.

FIG. 6A is a plan view showing the configuration of unframed laminates 410 in a portrait orientation over torque tube 33. In this context, unframed laminates 410 resemble a conventional solar panel before the panel is attached to the four frame members. As discussed above, edges of unframed laminates 410 may be treated with tape, encapsulant, plastic or thick aluminum or metal foil to protect internal components. The long edge of each adjacent unframed laminate 410 is received in shared frame rail 450. In some embodiments, and as shown in FIGS. 6A-C, after unframed laminates 410 are secured by shared frame rails 450, a pair of edge rails, such as edge rails 430A, 430B may be pushed over the short edge of the adjacent laminates to create a four-sided frame for laminates 410. Frame rail 450 has notches 452A, 452B at each distal end to provide clearance for edge rails 430A, 430B. In the example shown here, the edge rails 430A, 430B have a C-shaped profile, however, L-shaped profiles or double C profiles may also be used. In addition to sealing the edge and providing resistance to bending, edge rails 430A, 430B may also function as purlins. In addition to supporting laminates 410, these purlins may also be engaged by rotating tracker system components, such as, for example, in tracker systems that don't have a central torque tube and/or in systems that position two or more panels in portrait or landscape along each row.

Figure 7:
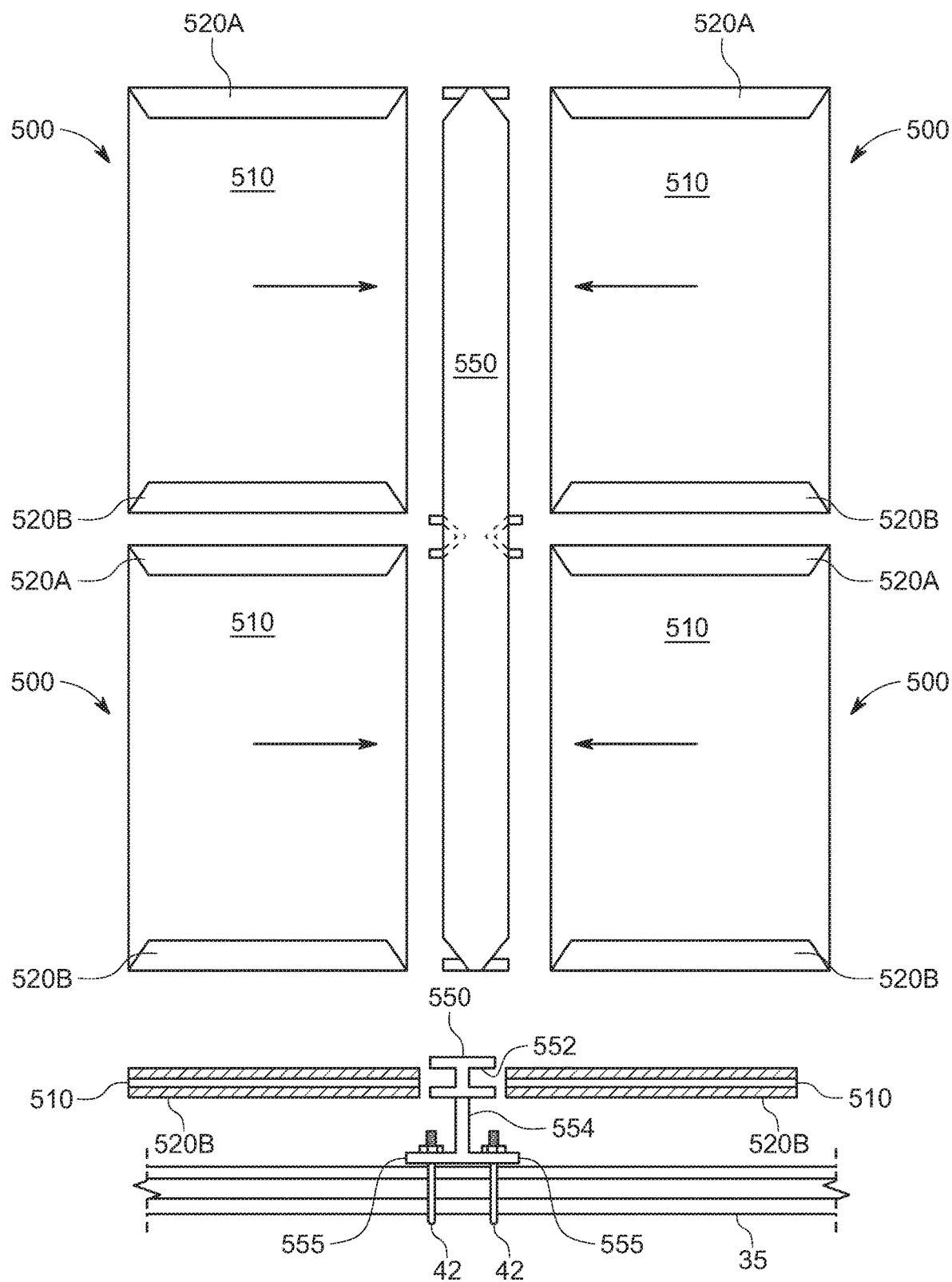
FIG. 7 shows another shared frame photovoltaic module and a torque tube mounting system for shared frame photovoltaic modules according to various embodiments of the invention.

Turning now to FIG. 7, this figure shows shared frame photovoltaic modules 500 and shared torque tube mounting rail 550 for shared frame photovoltaic modules according to various embodiments of the invention. FIG. 7 shows shared frame module 500 in a two-portrait configuration. It should be appreciated that the principles discussed in the context of this application are applicable to single modules in portrait as well as to landscape configurations.

Each laminate 510 shown in the Figure has a pair of opposing structural frame portions 520A, 520B that run parallel to the torque tube. In portrait, these are the short ends, whereas in landscape they would be the long ones. Frame portions 520A, 520B may be made of aluminum, plastic, or other suitable non-corroding material. The edge of each frame portion 520A, 520B is chamfered to allow it to fit with chamfered corners of shared frame rail 550. Frame rail 550 attaches to torque tube 35 using U-bolts 42 that surround the tube and protrude through flanges 555. Unlike torque tubes 30 and 33 shown in prior figures, torque tube 35 is faceted to increase strength, but is otherwise similar. Once rail 550 is attached to torque tube 35, the next module 500 may be inserted into recess 552 in rail 550, until the chamfered edges of frame portions 520A, 520B are aligned with chamfered edges in rail 550. In some embodiments, no additional fasteners may be needed because the chamfered edges prevent the modules from sliding out. In other embodiments, additional screws, bolts, or other fasteners may be used to secure modules 510 to shared frame rail 550.

Figure 8A:
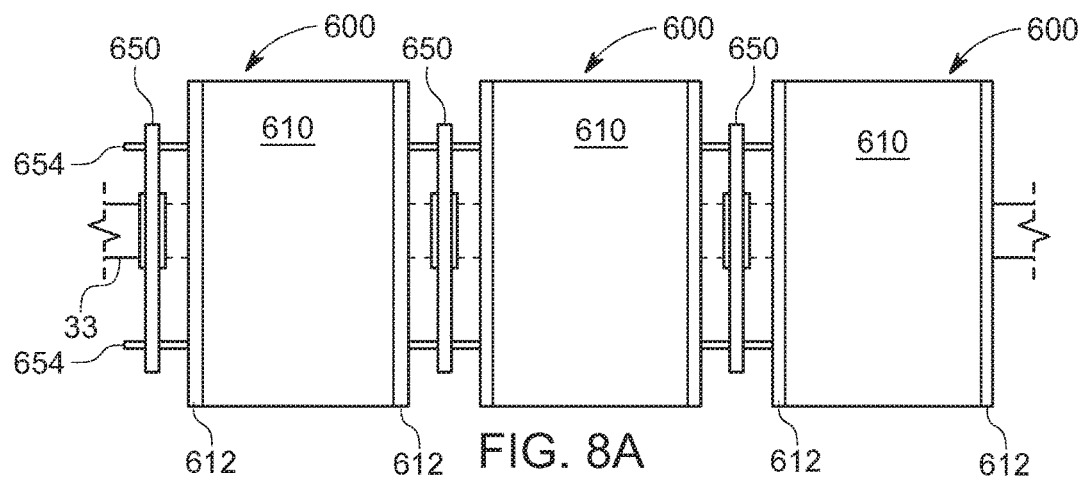
FIG. 8A shows a portion of a single-axis tracker with shared frame photovoltaic modules and torque tube mounting rail for such modules according to various embodiments of the invention.
Figure 8B:
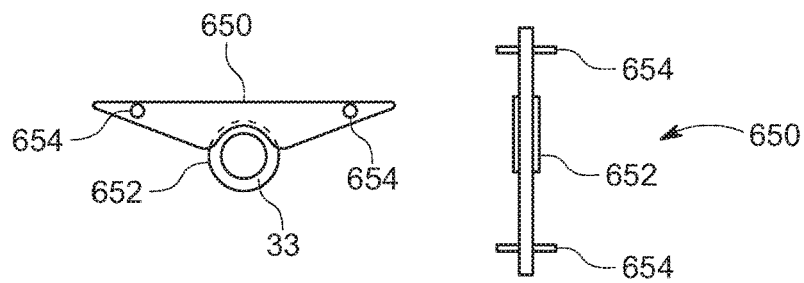
FIG. 8B shows side and top views of the torque tube mounting rail for shared frame photovoltaic modules shown in FIG. 8A.
Figure 8C:
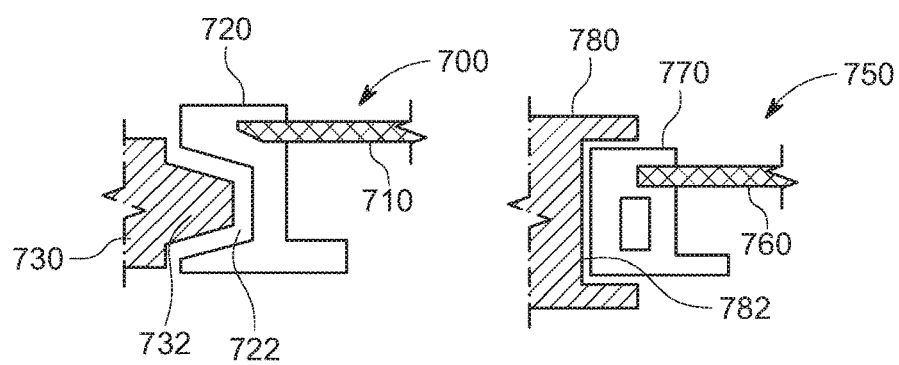
FIG. 8C shows two different torque tube mounting rail profiles for shared frame photovoltaic modules according to various embodiments of the invention.
Figure 8D:
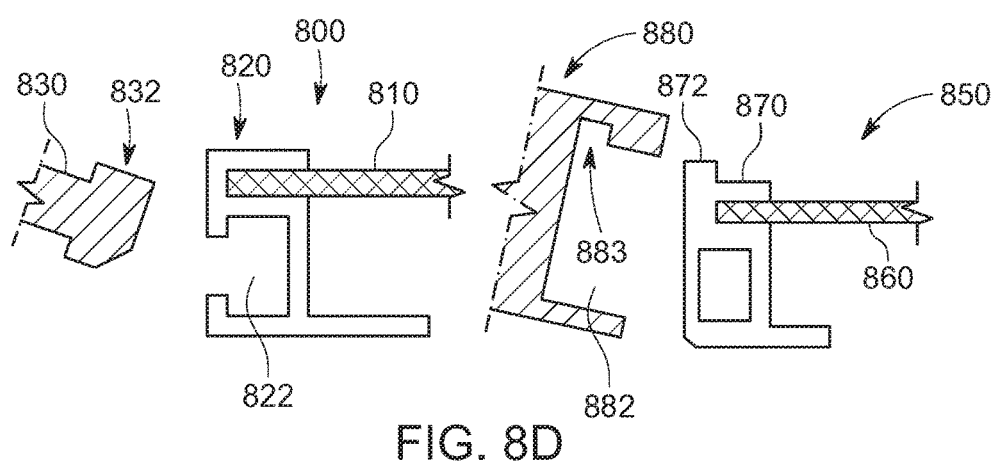
FIG. 8D shows two additional torque tube mounting rail profiles for shared frame photovoltaic modules according to various embodiments of the invention.
Figure 8E:
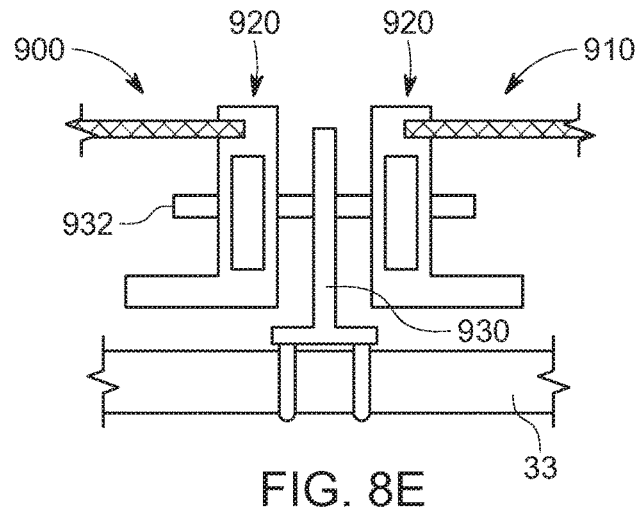
FIG. 8E shows a pin-based mechanism for joining adjacent shared frame photovoltaic modules to shared rail according to various embodiments of the invention.

FIG. 8A shows a portion of a single-axis tracker with shared frame photovoltaic modules 600 and torque tube mounting bracket 650 for such modules according to various embodiments of the invention. In various embodiments, each module 600 may have frame portion 612 extending along its long edge, that is the edge that is perpendicular to the torque tube, as shown in greater detail in FIGS. 8C-E. In this case, bracket 650 is shown generically in FIG. 8A, while FIGS. 8C-E show various configurations of this structure. Modules 600 float above torque tube 33 via rail brackets 650 that engage torque tube 33 with a strap, U-bolt, or other fastener 652 that enables it to fit over torque tube 33 like a saddle. Connecting portions 654 positively engage framed edges of each module 600 to hold them in place.

Starting with FIG. 8C, in this figure, two different profiles of shared frame rails are shown. Rail 730 includes male projection 732 that is received in a corresponding female opening formed in the frame of 720. Once rail 730 is attached to torque tube 33, module 700 is butted up against it so that frame 720 receives projection 732 in opening 722. Frame rail 780 has the opposite geometry where frame 770 of module 750 is received within channel 782 until it buts up against rail 780. Rails 730 and 780 may extend along the long upper edge of bracket 650, that is opposite to fastener 652, above connecting portions 654. Likewise, in FIG. 8D, rail 830 has a rectangular-shaped lobe 832 with a chamfered edge that is received in a corresponding recess 822 formed in frame 820 of module 800. This enables modules 800 to be pivoted into and out of frame rail 830. By contrast, rail 880 provides a notched recess 882 with notch 883 that receives corresponding projection 872 of frame 870 of module 850. It should be appreciated that in any of the rails 730, 780, 820, or 880 shown herein, the features on either side may not be symmetric. That is, module frames may be pivoted in on one side and simply be received within a C-shaped channel on the opposing side to speed up installation since the module plane is already substantially perpendicular to the torque tube after mating its leading edge into one of the rails 730, 780, 820, or 880. Similarly, module frame sections may be different on each side of PV modules 700, 750, 800 or 850, for example, with alternating male and female features. In addition, any of modules 600, 700, 750, 800, or 850 may have a puck, rail or other feature on the underside to provide resistance to sagging towards the torque tube in the absence of a frame on those ends, as seen, for example, in FIG. 5A.

FIG. 8E shows a pin-based mechanism for joining adjacent shared frame photovoltaic modules to shared rail 930 according to various embodiments of the invention. In the system shown in this figure, shared torque tube mounting rail 930 is positioned between adjacent PV modules 900. Each module 900 has a frame 920 running along its long sides, that is, the ones that are orthogonal to the axis of the torque tube. Pin 932 is pressed through openings in module frame portions 920 and through shared rail 930 to hold the modules in place. There may be one positioned at each end of rail 930, such as connecting portions 654 shown, for example, in FIGS. 8A and 8B. A tool or gun may be used to press each pin 932 through frame sections 920 and rail 930. Alternatively, pin 932 may already be extending out of each side of rail 930. Module frames 920 may be predrilled with holes to receive the pins 932 at the appropriate spacing dictated by rail 930. Also, pin 932 may be threaded on each end and receive a retaining nut to hold modules 900 in place.

Figure 9A:
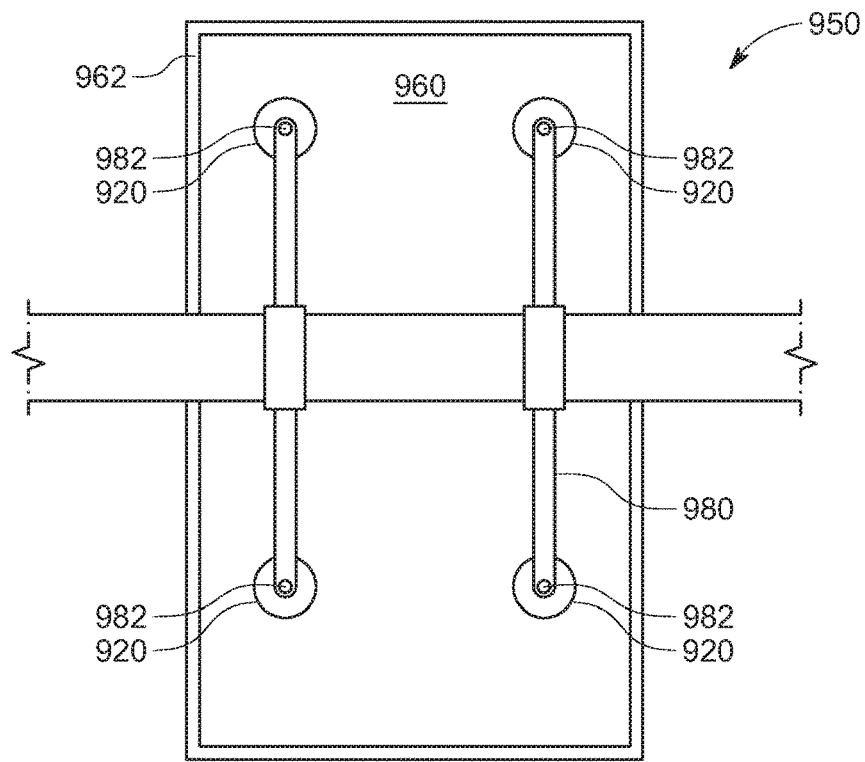
FIGS. 9A and B show a frameless photovoltaic modules and torque tube mounting brackets for such modules according to various embodiments of the invention.
Figure 9B:
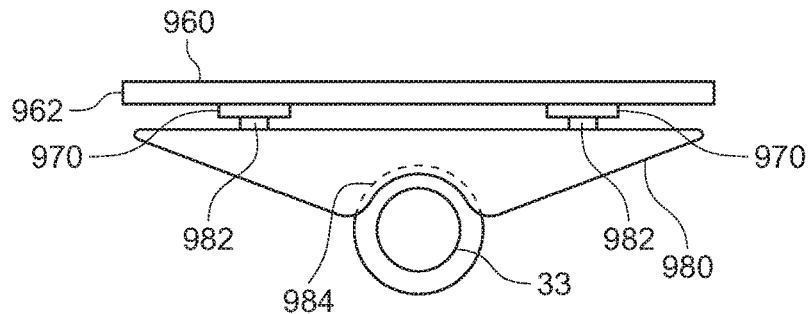

FIGS. 9A and B show reduced frame photovoltaic modules 950 and torque tube mounting brackets 980 for such modules according to various embodiments of the invention. Modules 950 shown in FIGS. 9A and 9B have a reduced profile frame 962. Unlike traditional frames that must be several inches thick to provide structural integrity to the laminate as well as to provide a flange for connection to the torque tube, frame 962 need only perform the former function. Modules 950 have been modified to include four puck-like members 970 on the underside of laminate 960. These puck-like members serve as connection points for mounting bracket or rail 980. Bracket 980 sits like a saddle on torque tube 33 with fastener 984 holding it in place. Pins, screws, or other fasteners 982 at or near the opposing ends of bracket 980 enable modules 950 to be connected to torque tube 33 via pucks 970. This eliminates the physical burden that would be otherwise be imposed on frame 962 from the racking hardware, enabling substantially less aluminum to be used to construct the frame. Installation may be accomplished by installing all the necessary brackets along torque tube 33 and then dropping modules 950 onto each adjacent bracket pair and fastening them in place from below. Module electrical connections may be done using conventional means.

The embodiments of the present inventions are not to be limited in scope by the specific embodiments described herein. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A system comprising:
   a pair of substantially rectangular photovoltaic modules, each module comprising an energy generating portion laminated between top and bottom protective layers and a pair of first frame members on two opposing edges; and
   a shared frame member having a pair of opposing recess running substantially the entire length thereof, the shared frame member receiving respective portions of the pair of photovoltaic modules along non-framed edges to form an interconnected pair of photovoltaic modules attached to a tracker torque tube, wherein the shared frame member comprises one or more embedded insulated conductive channels that contact conductive pads in the non-framed edges of the pair of photovoltaic modules to provide electrical interconnection between the pair of photovoltaic modules.

2. The system according to claim 1, wherein the pair of first frame members are positioned on short edges of each photovoltaic module.

3. The system according to claim 1, wherein the torque tube is oriented transverse to the shared frame member and further comprising a pair of fasteners attaching opposing flange portions of the shared frame member to the torque tube thereby coupling the pair of photovoltaic modules to the torque tube.

4. The system according to claim 1, further comprising a notch formed at respective ends of each opposing recess, each notch receiving a portion of one of the pair of first frame members.

5. The system according to claim 1, wherein the top protective layer is glass.

6. The system according to claim 1, wherein both top and bottom protective layers are glass.

7. The system according to claim 1, further comprising fasteners passing through an end portion of each first frame member into the shared frame member.

8. A system comprising:
   a first photovoltaic module;
   a second photovoltaic module; and
   a shared frame rail, the shared frame rail having a portion receiving respective opposing unframed edges of the first and second photovoltaic modules and securing the modules to one another and to a single-axis tracker torque tube, wherein the shared frame rail comprises one or more embedded insulated conductive channels that contact conductive pads in the unframed edges of the first and second photovoltaic modules to provide electrical interconnection between the first and second photovoltaic modules.

9. The system according to claim 8, wherein the first and second photovoltaic modules each comprise a pair of opposing frame members on no more than two sides of each module.

10. The system according to claim 9, wherein the opposing frame members are chamfered at their respective ends.

11. The system according to claim 9, wherein the opposing frame members comprise a notched portion at each end received within openings formed in opposing ends of the shared frame rail.

12. The system according to claim 9, the shared frame rail comprises a pair of opposing flanges and a pair of opposing channels interconnected by a spine.

* * * * *